(12) United States Patent
Ando (10) Patent No.: US 6,198,999 B1
(45) Date of Patent: Mar. 6, 2001

(54) AIRBAG DEPLOYMENT MODE SELECTION SYSTEM

(75) Inventor: Junichi Ando, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/487,781

(22) Filed: Jan. 20, 2000

(30) Foreign Application Priority Data

Jan. 21, 1999 (JP) .................................................. 11-013446

(51) Int. Cl.$^7$ .................................................. B60R 21/00
(52) U.S. Cl. ........................ 701/45; 280/728.1; 280/735; 340/438; 180/271
(58) Field of Search ................................. 701/45, 46, 47; 280/728.1, 730.1, 734, 735; 340/438; 180/271, 282; 307/9.1

(56) References Cited

U.S. PATENT DOCUMENTS

| | | | |
|---|---|---|---|
| 5,490,069 | * | 2/1996 | Gioutsos et al. ........................ 701/45 |
| 5,540,461 | * | 7/1996 | Nitschke et al. ........................ 280/735 |
| 5,782,485 | * | 7/1998 | Takeda et al. ........................ 280/735 |
| 5,868,423 | * | 2/1999 | Takimoto et al. ........................ 280/735 |

* cited by examiner

Primary Examiner—William A. Cuchlinski, Jr.
Assistant Examiner—Yonel Beaulieu
(74) Attorney, Agent, or Firm—McDermott, Will & Emery (57) ABSTRACT

In an airbag deployment mode selection system, the closer an occupant approaches to an airbag deployment port, the quicker the reflected signal therefrom is received by a reflected signal receiver, a range-finding signal generator being caused to generate subsequent range-finding signals (A2, A3) and so on immediately after the reception of the reflected signals (S21, S22) and so on by the reflected signal receiver. By doing this, the shorter the distance from the airbag deployment port to the occupant is, the shorter is the period for measuring the distance by a distance sensor, thereby accurately measuring the distance from the airbag deployment port to the occupant immediately before the airbag is operated in order to select an appropriate airbag deployment mode.

4 Claims, 6 Drawing Sheets

AIRBAG DEPLOYMENT MODE SELECTION SYSTEM

BACKGROUND OF THE INVENTION

The present invention relates to an airbag deployment mode selection system.

In an existing airbag system, the airbag deployment mode is divided into a full deployment mode in which the airbag is deployed with full pressure, and a tailored deployment mode, in which the airbag is deployed in a plurality of timed stages or with a pressure that is smaller than the full deployment mode. By making tailored deployment of the airbag when a passenger is near the airbag deployment port, the passenger is protected from the vehicle collision shock and also from the shock from the shock imparted to the body when the airbag deploys, and by making full deployment of the airbag when the passenger is at a position distant from the airbag deployment port, the passenger is protected from the collision shock.

In this airbag system of the past, a distance sensor for sending the position of a passenger was mounted on an instrument panel or at some other appropriate position. This distance sensor generates a range-finding signal directed at the passenger and receives a returning signal that is reflected from the passenger, the spatial propagation time between the generation of the range-finding signal and the reception of the reflected signal being used to determine the position of the passenger. If this position indicates that the passenger is nearer to the airbag deployment port than a prescribed distance, the airbag is deployed in the tailored deployment mode.

SUMMARY OF THE INVENTION

In order to achieve the above-noted distance sensing function, the distance sensor has a range-finding signal generator that generates a range-finding signal at a fixed period, and a receiving sensor for receiving the corresponding reflected signal. The time difference from the range-finding signal generation until reception of the reflected signal is used to determine the distance to the passenger.

The airbag is caused to deploy when a vehicle collides with an object in its path of travel. In most cases, the driver applies the brakes immediately before the impact, causing the body of the driver to move forward, so that the driver's body is placed into proximity to the deployment port of an airbag installed with the steering wheel or instrument panel. This being the case, it is necessary to soften the shock occurring when the airbag deploys. Because the distance sensor in an airbag system of the past measures the distance to the passenger with a time period that is fixed, it is difficult to accurately ascertain the distance from the airbag deployment port to the passenger, thereby leading to the danger that the full deployment mode will be selected even if the passenger is very close to the airbag deployment port.

The present invention was made in consideration of the above-noted problem in the related art, and has as an object to provide an airbag deployment mode selection system that measures the distance from an airbag deployment port to a passenger with a time period that shortens as this distance shortens, thereby properly determining the distance from the passenger to the deployment port immediately before operation of the airbag so as to make a proper selection of the airbag deployment mode.

An aspect of an airbag deployment mode selection system has a distance sensor with a range-finding signal generator for generating a range-finding signal directed toward the seated direction of a passenger and a reflected signal receiver for receiving range-finding signal that is returned by reflection from the passenger, and determines the distance from an airbag deployment port to the passenger based on the time difference between the range-finding signal generation and the reception of the reflected signal. This aspect of the invention also has a signal generation timing controller for causing the range-finding signal generator to generate a next range-finding signal immediately after reception of the reflected signal from the previously generated range-finding signal from the distance sensor, and a deployment mode selector for issuing an instruction that selects the full deployment mode when the distance of the passenger from the airbag deployment port exceeds a prescribed distance, and issues an instruction that selects the tailored deployment mode when this distance is shorted than the prescribed distance.

In the above-described airbag deployment mode selection system, a range-finding signal generator disposed on an instrument panel or at some other appropriate position generates a range-finding signal directed at the seated direction of the passenger, and a signal receiving sensor receives the reflected range-finding signal from the passenger, the distance from the airbag deployment port to the passenger being determined by the spatial propagation time between generation the return of the range-finding signal. The signal generation timing controller causes the range-finding signal generator to generate a next range-finding signal immediately after the reception of the reflected signal from the previous range-finding signal.

The deployment mode selector selects the full deployment mode if the distance from the airbag deployment port to the passenger detected by the distance sensor is greater than a prescribed value and selects a tailored deployment mode if this distance is less than the prescribed value, issuing a corresponding instruction to an external airbag deployment controller.

According to this aspect of the present invention, as the passenger approaches the airbag deployment port, the amount of time required between the generation of the range-finding signal by the range-finding signal generator and the reception of the returning reflection by the reflected signal receiver becomes commensurately shorter, and immediately triggers the generation of the next range-finding signal by the range-finding signal generator. Thus, the closer the passenger comes to the airbag deployment port, the shorter becomes the period of measurement by the distance sensor of the distance therebetween, thereby enabling a more accurate measurement of the distance of the passenger to the airbag deployment port for use in selecting an appropriate airbag deployment mode. In particular, this enables the avoidance of full deployment of the airbag when the body of the passenger is in extreme proximity to the airbag deployment port

BRIEF DESCRIPTION OF THE DRAWINGS

The above and further objects and novel features of the present invention will more fully appear from the following detailed description when the same is read in conjunction with the accompanying drawings, in which.

DESCRIPTION OF THE PREFERRED EMBODIMENTS

Details of a embodiments of an airbag deployment mode selection system according to the present invention are described below, with reference to relevant accompanying drawings.

Figure 1:
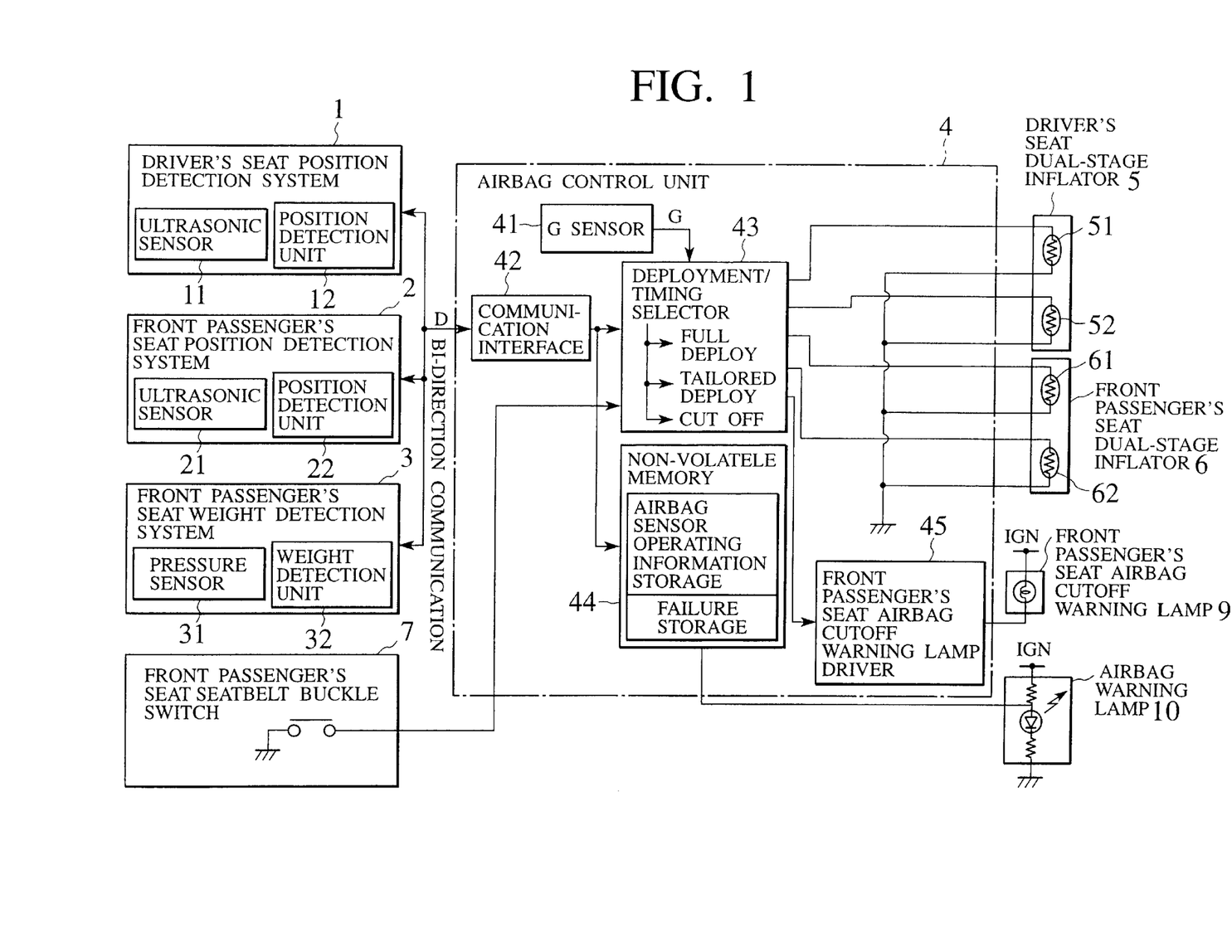
FIG. 1 is a block diagram showing an airbag system employing the first embodiment according to the present invention.

FIG. 1 shows an overall airbag system according to an embodiment of the present invention. This system has a driver's seat position detection system 1 for measuring the distance from an airbag deployment port of an airbag buried within the steering wheel to the passenger (driver) in the driver's seat, a front passenger's seat position detection system 2 for measuring the distance from an airbag deployment port of an airbag buried behind an instrument panel to a passenger seated in that seat, a passenger's seat weight detection system for detecting whether or not a passenger is seated in the front passenger's seat, an airbag control unit for controlling deployment of an airbag, a driver's seat dual-stage inflator 5 and a front passenger's seat dual-stage inflator 6 for causing deployment of the driver's seat airbag and the front passenger's seat airbag, respectively, in either the full deployment mode or the tailored deployment mode, in accordance with an instruction from the airbag control unit 4.

The airbag system of this embodiment also has a front passenger's seat seatbelt buckle switch 7 which turns on when the front passenger's seatbelt is fastened, and a front passenger's seat airbag cutoff warning lamp 9 for giving notification that the front passenger's seat airbag has been disabled (cut off) so that it is not needlessly deployed when there is no passenger in the front passenger's seat, and an airbag alarm lamp 10 that warns of a failure of the airbag function.

The driver's seat position detection system has an ultrasonic sensor 11 for generating an ultrasonic signal directed toward the seated driver and receiving a returning ultrasonic signal that is reflected from the driver, and a position detection unit 12 for variably controlling the period with which the ultrasonic sensor 11 generates an ultrasonic range-finding signal, measuring the time difference between generation of the ultrasonic range-finding signal by the ultrasonic sensor 11 and the reception of the reflected signal, and calculating the distance from the deployment port of an airbag, which is usually buried within the steering wheel, to the driver, based on this time difference.

The front passenger's seat position detection system 2, similar to the case of the front passenger's seat position detection system 1, has a ultrasonic sensor for generating an ultrasonic signal directed toward a passenger seated in the front passenger's seat and receiving a returning ultrasonic signal that is reflected from the passenger, and a position detection unit 22 for variably controlling the period with which the ultrasonic sensor 21 generates an ultrasonic range-finding signal, measuring the time difference between generation of the ultrasonic range-finding signal by the ultrasonic sensor 21 and the reception of the reflected signal, and calculating the distance from the deployment port of an airbag, which is usually buried behind an instrument panel, to the passenger, based on this time difference. The front passenger's seat weight detection system 3 has a pressure sensor 31 for sensing the weight of a passenger seated in the front passenger's seat and outputting a detection signal of a strength that is responsive to the sensed weight, and a weight detection unit 32 for judging whether or not a passenger is seated in the front passenger's seat, based on the signal output by the pressure sensor 31.

The airbag control unit 4 includes a G sensor 41 for detecting the negative acceleration imparted when the vehicle experiences a collides with an object, a communication interface 42 for perform bi-directional data communication between the driver's seat position detection system 1, the front passenger's seat position detection system 2, and the front passenger's seat weight detection system 3, a deployment/timing selector 43 for inputting a signal from the G sensor 41, signals via the communication interface 42 from the driver's seat position detection system 1, the front passenger's seat position detection system 2, and the front passenger's seat weight detection system 3, and a signal from the front passenger's seat seatbelt buckle switch 7, and for determining whether or not it is necessary to deploy the driver's seat airbag and the front passenger's seat airbag, the deployment mode, and also whether or not the front passenger's seat airbag operation should be cut off, a non-volatile memory for storing operation information and failure information of the airbag control unit 4, and a front passenger's seat airbag cutoff warning lamp driver 45 for operating the front passenger's seat airbag cutoff warning lamp 9 if the judgment is made to disable the front passenger's seat airbag.

The driver's seat dual-stage inflator 5 has two igniters 51 and 52, which are built into the center part of the steering wheel. In the full deployment mode, both igniters are operated simultaneously to cause high-speed deployment with full pressure. In the tailored deployment mode, however, the igniter 51 is operated first, followed by operation of the other igniter 52 after a prescribed time delay, thereby causing a soft, dual-stage deployment of the airbag.

In the same manner, the front passenger's seat dual-stage inflator 6 has two igniters 61 and 62, which function in the same manner as those of the driver's seat dual-stage inflator 5.

The tailored deployment mode is selected for either or both of the airbags by the driver's seat position detection system 1 and the front passenger's seat position detection system 2 if the respective passenger is detected as being closer to the respective airbag deployment port than a prescribed distance. It should be noted that, rather than timing the operation of the two igniters, the tailored deployment mode can alternately be achieved by operating just one of the pair of igniters for each of the airbag deployment systems (51 and 61), although there is freedom in selecting the actual method employed.

Figure 2:
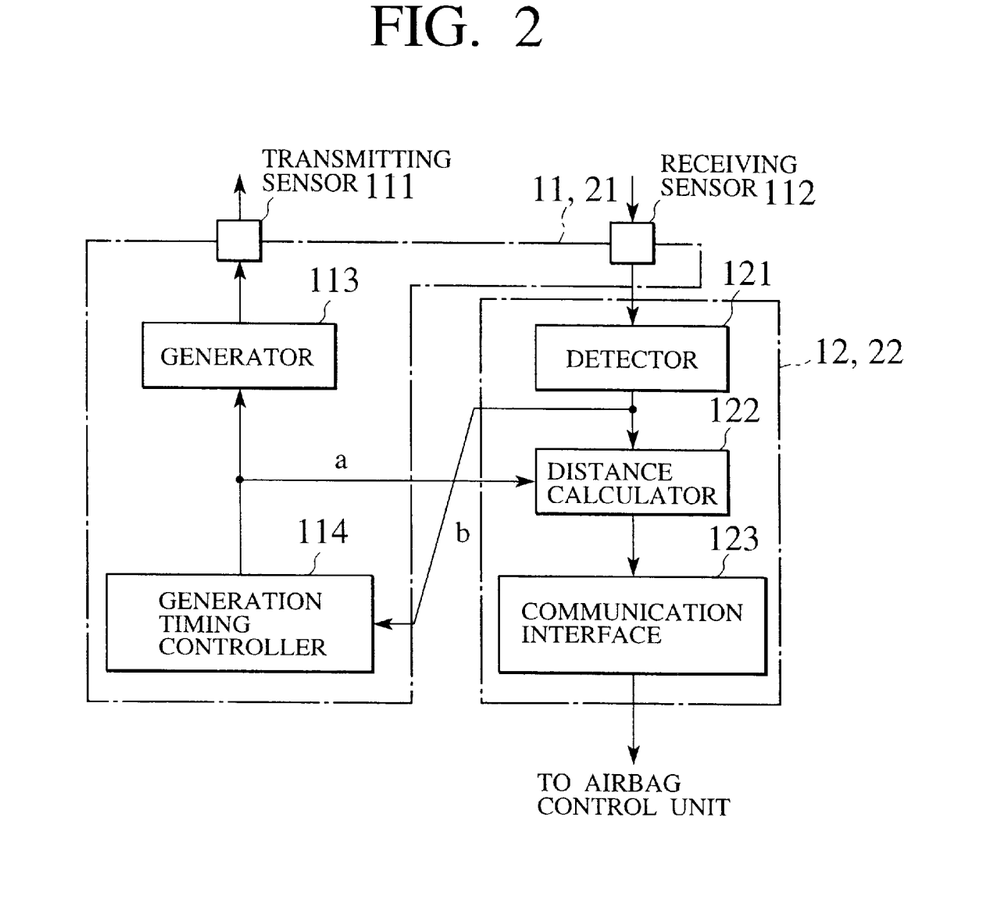
FIG. 2 is a detailed internal block diagram a driver's seat position detecting system and a front passenger seat position detection system in the embodiment shown in FIG. 1.

The driver's seat position detection system 1 and front passenger's seat position detection system 2 are described in further detail below, with reference being made to FIG. 2.

The ultrasonic sensors 11 and 21 are each made up of a transmitting sensor 111 for generating an ultrasonic range-finding signal, a receiving sensor 112 for receiving a reflected range-finding signal returning from the direction of a passenger, a generator 113 which causes the transmitting sensor 111 to output an ultrasonic signal, and a generation timing controller 114 for receiving a reflected signal receiving timing signal b with respect to the range-finding signal and outputting a range-finding signal generation command to the generator 113 immediately thereafter. The position detection units 12 and 22 are each made up of a detector 121 for detecting a reflected range-finding signal from the signal received by the receiving sensor 112, a distance calculator 122 for receiving a timing signal a indicating the timing of generation of a range-finding signal by the generator 113 and a timing signal b indicating the timing of reception of the returning signal by the detector 121, and calculating the distance D to the passenger from the spatial propagation distance of the range-finding signal based on the time difference therebetween, and a communication interface 123 for outputting the detected distance D to the airbag control unit 4.

Figure 3A:
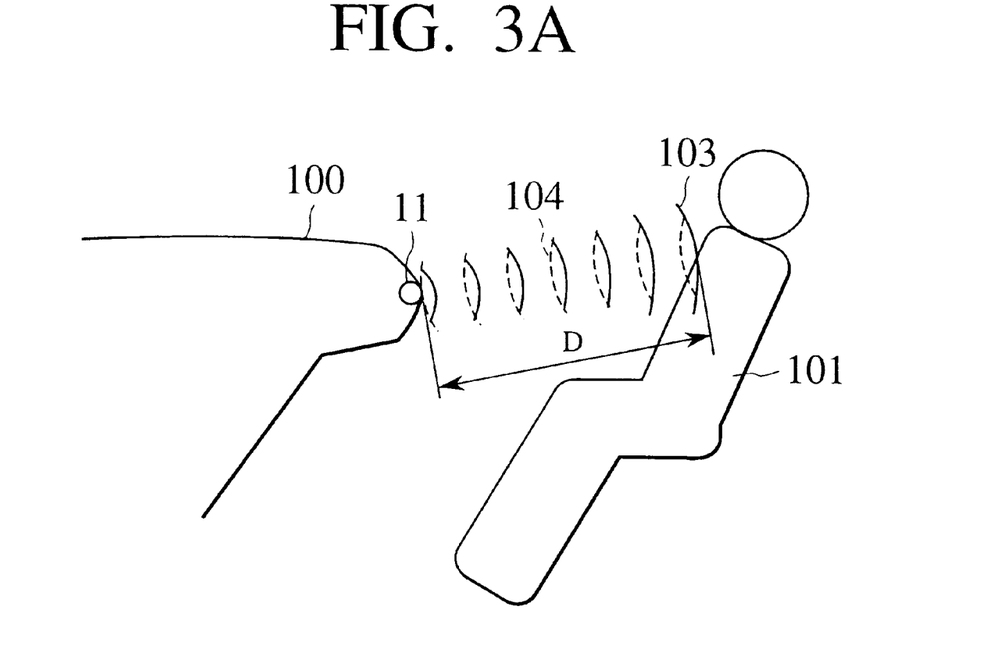
FIGS. 3A and 3B are drawings illustrating the movement of a passenger when the brakes are applied suddenly immediately before a collision.

The operation of the above-noted airbag system is as follows. This is described with respect to the driver's seat airbag system, but applies as well to the front passenger's seat airbag system. As shown in FIG. 3A, the ultrasonic sensor 11 mounted to the instrument panel 100 generates an ultrasonic range-finding signal 103 directed toward the occupant 101. A reflected signal 104 from the occupant 101 returns to and is received by the ultrasonic sensor 11. It is possible to measure the distance from the sensor 11 to the occupant 101 based on the spatial propagation time between the generation of the range-finding signal and the reception of the returning reflected signal. If, as shown in FIG. 3B, the driver notices an object in front of the vehicle and applies the brakes suddenly immediately before impact therewith, the driver's body moves forward into close proximity with the ultrasonic sensor 11, at which instant the G sensor might incorrectly detect a collision shock and cause the full deployment of the airbag.

One approach that can be envisioned to prevent the above-noted false detection from happening, is that of performing the measurement of distance from the start with a period sufficient short that, even if the occupant 101 moves forward immediately before a collision, it is possible to properly measure the distance D from the sensor 11 to the occupant 101. It might be noted at this point that, although the actual distance of interest is the distance from the airbag deployment port, because the mounting position of the sensor 11 relative to the airbag deployment port is fixed, it is possible to treat the distance D to the sensor 1 the same as the distance from the airbag deployment port.

Following the above-noted approach, however, if an attempt is made to measure a relatively long distance D to the occupant 101 using a short measurement period, because the spatial propagation speed of the ultrasonic range-finding signal is finite, the condition occurs in which the next range-finding signal is generated before the return of the previous range-finding signal, thereby preventing proper identification of the returning signal of interest. In addition, this type of high-speed distance measurement leads to a loss of energy.

Figure 3B:
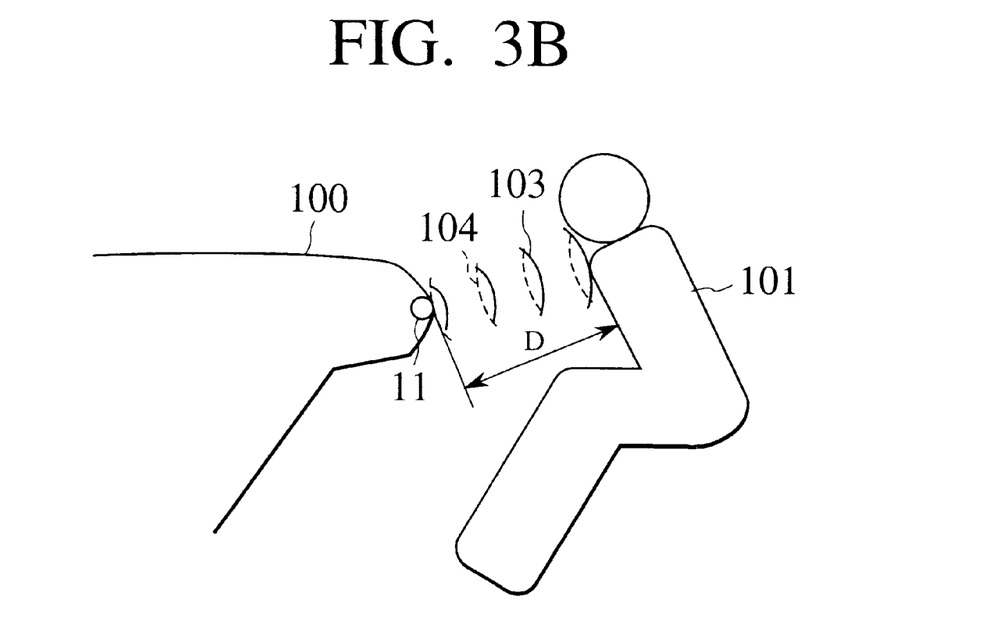

On the other hand, such high-speed distance measurement actually becomes necessary only immediately before a collision, as shown in FIG. 3B, in which case the distance from the ultrasonic sensor 11 to the occupant 101 is short and the spatial propagation time is also short, so that the above-noted problem does not arise, even if distance is measured repeated with a short period.

Figure 4A:
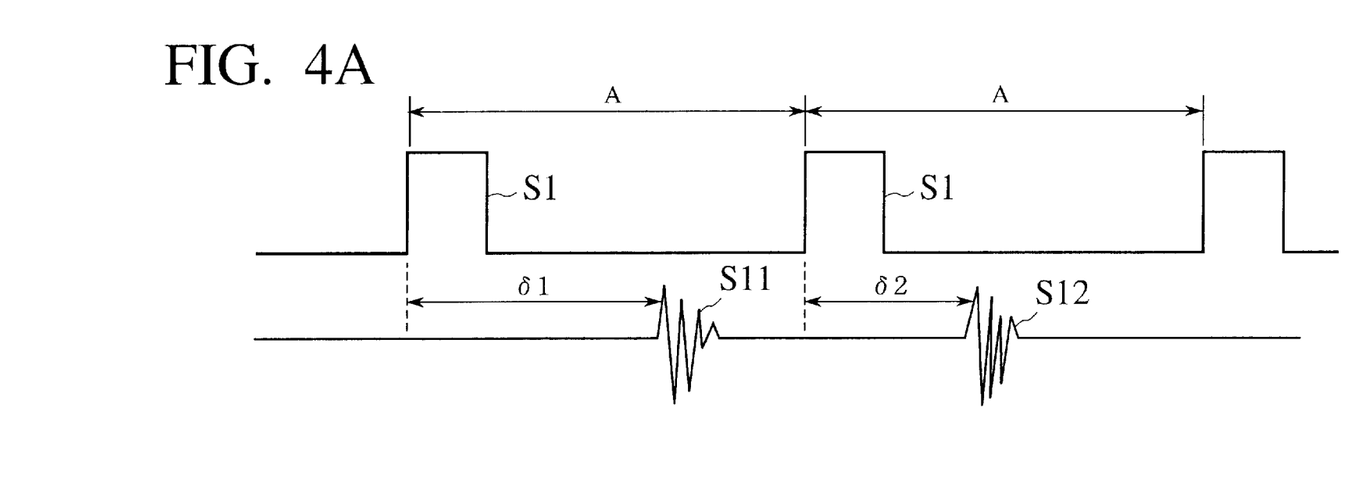
FIGS. 4A and 4B are timing diagrams showing the transmitting and receiving timing of the range-finding signal and reflected signal in the embodiment shown in FIG. 1.
Figure 4B:
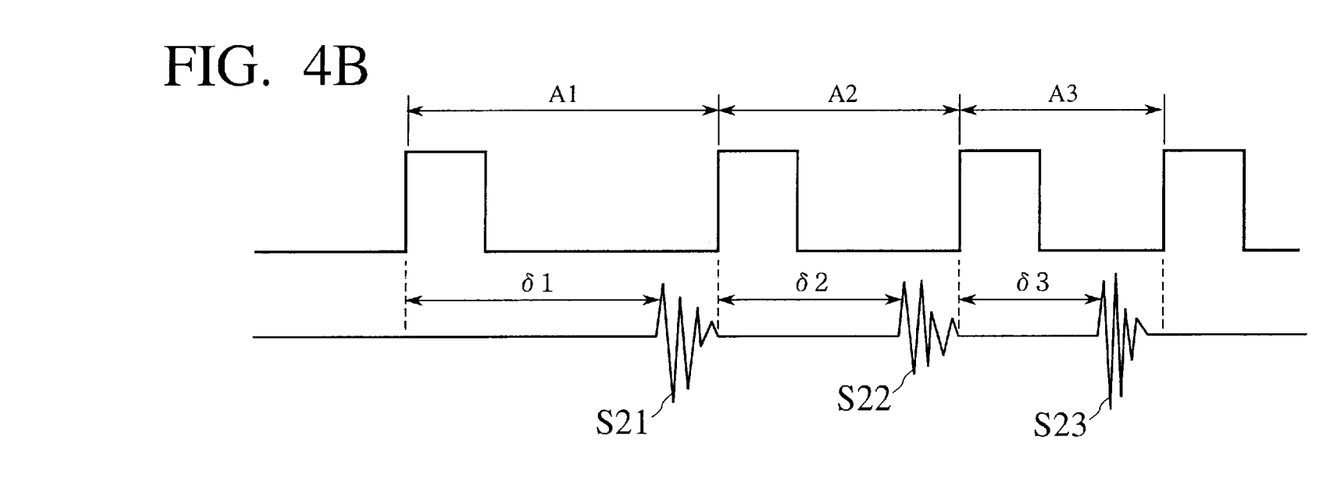

In view of foregoing, a maximum period A is set, distance measurement being repeated with this period A in the case in which the reflected signal 104 is not received. When the distance to the occupant 101, however, becomes such that it is possible to receive the reflected signal 104 and measure the distance, control is performed by the generation timing controller so that a new ultrasonic range-finding signal is output immediately following the reception of the reflected signals S21, S22, and so on. By doing this, as shown in FIG. 4B, the generation period of the ultrasonic range-finding signal is shortened as the body of the occupant 101 moves forward, making the distance D to the sensor 11 progressively shorter. This generation period is changed in the sequence A1, A2, A3, and so on, with each period shorter than the previous period as the body of the occupant 101 approaches the sensor 11. By shortening the measurement period in this manner, it is possible to properly determine the distance D from the airbag deployment port to the occupant immediately before deploying the airbag, thereby enabling a proper selection of an appropriate airbag deployment mode.

Figure 5:
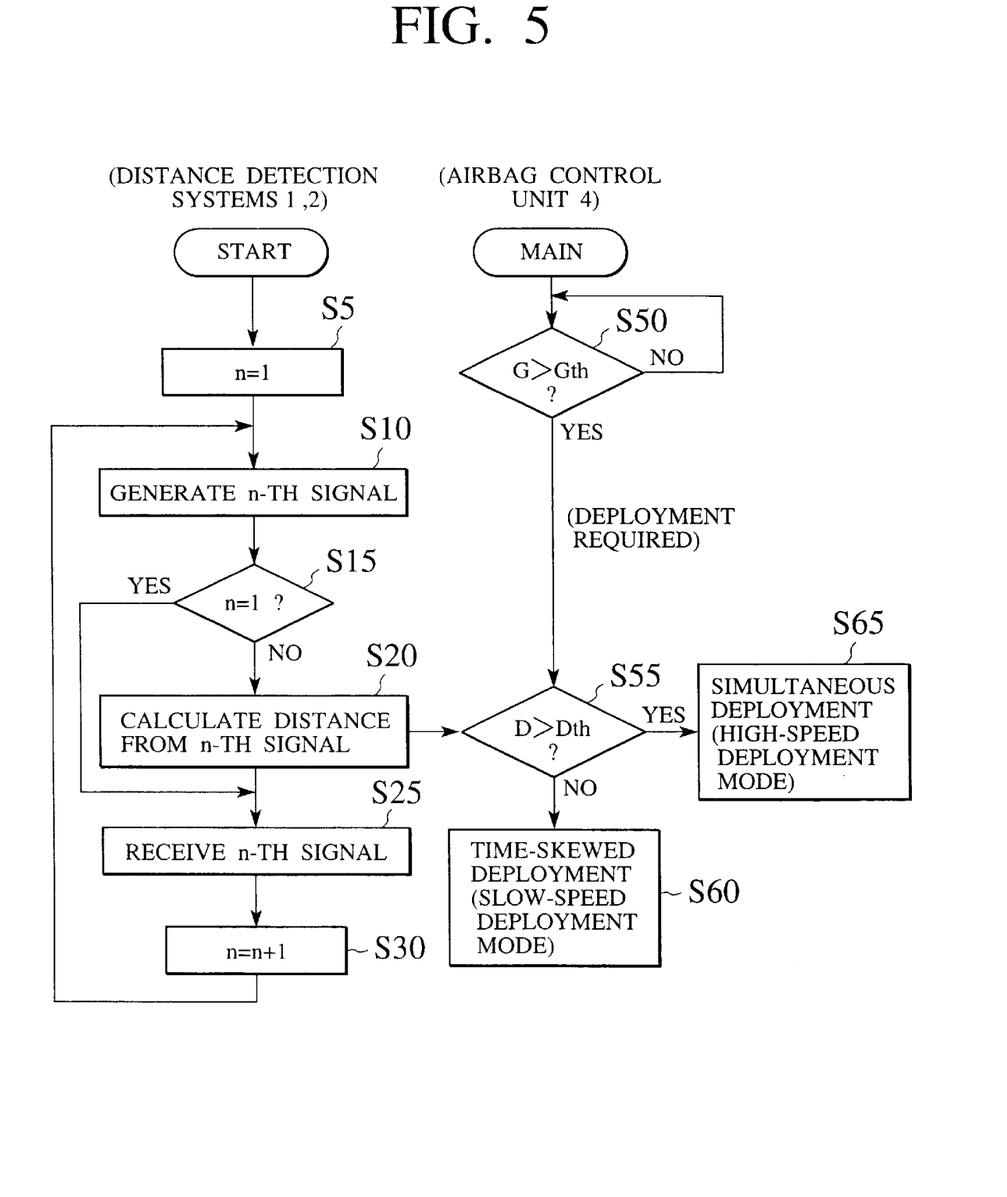
FIG. 5 are flowcharts showing the operation of the position detection system and airbag control unit in the embodiment shown in FIG. 1.

The above-noted concept is applied in the generation timing controller 114 and the distance calculator 122 in controlling the generation timing of the ultrasonic range-finding signal and the execution of the distance calculation, as illustrated in the flowchart of FIG. 5. At the first step n=1 (step S05), because no previous distance measurement has been made, a distance calculation is not performed (execute step S10 and branch to YES at step S15). At the distance measurements of second and subsequent steps ($n \geq 2$) if the receiving sensor 112 receives the reflected signal from the previous (n−1 generation) range-finding signal and the detector 121 detects this signal (steps S25 and S30), upon receiving the timing signal b for reception of the reflected signal, the generation timing controller 114 causes the generator 113 and the transmitting sensor 111 to generate the n-th ultrasonic range-finding signal (step S10).

Then, when the generation timing controller 114 gives the timing signal a of the generation of the new n-th ultrasonic range-finding signal to the generator 113, the distance calculator 122, triggered by this signal a, performs a distance calculation based on the time differences $\delta 1$, $\delta 2$, and so on, the result of the calculation being output to the airbag control unit 4 via the communication interface 123.

By having the generation timing controller 114 perform control so as to cause the generation of a next n-th ultrasonic range-finding signal when the detector 121 receives and detects the reflected signal from the previous (n−1) ultrasonic range-finding signal, as shown in FIG. 4B (in contrast to the uniform period shown in FIG. 4A), generation of a new ultrasonic range-finding signal immediately after the reception of the reflected signals S21, S22, and so on is repeated with a period that becomes successively shorter as the distance D becomes shorter by forward movement of the body of the occupant 101.

Along with the above action, by calculating, in the distance calculator 122, the distance D to the occupant's body at the previous (n−1) time, based on the time differences $\delta 1$, $\delta 2$, and so on between the timing of generation of the range-finding signal and the timing of reception of the corresponding reflected signal for each such generation timing, the shorter the range-finding signal generation period becomes, the shorter become the period for measuring distance, thereby enabling the proper determination of the distance D from the airbag deployment port to the occupant immediately before the start of the airbag deployment, in an airbag deployment mode appropriate to the thus-determined distance.

In the airbag control unit 4, the negative acceleration detected by the G sensor 41 is compared with an acceleration threshold value Gth in the deployment/timing selector 43, so as determine whether there is a need to deploy the airbag (step S50).

If the detected acceleration value G detected by the G sensor 4 exceeds the acceleration threshold value Gth, a comparison is made of the distance D input via the communication interface 42 from the driver's seat position detection system 1 or the front passenger's seat position detection system 2 with a distance threshold value Dth (step S55). If the detected distance D is smaller than the distance threshold value Dth (i.e., if the occupant come into close proximity of the airbag deployment port), a tailored deployment mode command is output (step S60).

If the comparison of the distance D to the occupant is compared to the distance threshold value Dth (step S55) and found to be larger than the value of Dth (i.e., if the occupant is at a position at some distance from the airbag deployment port), a full deployment mode command is output (step S65).

When the tailored deployment mode command is received by the driver's seat dualstage inflator 5 and the front passenger's seat dual-stage inflator 6, the inflators 51 and 52 and the inflators 61 and 62, respectively, are operated with a time delay therebetween to achieve a stepped or small deployment of the corresponding airbag, thereby reducing the shock imparted to the occupant when a collision occurs to a relatively small shock. When the full deployment mode command is received, the igniters 51 and 52 and the igniters 61 and 62 are operated simultaneously, so as to achieve high-speed, full pressure expansion of the airbag.

The front passenger's seat airbag cutoff shown in FIG. 1 is the function which, when it is detected by the front passenger's seat weight detection system 3 that there is no occupant seated in the front passenger's seat, disables deployment of the front passenger's seat airbag, in which case the deployment/timing selector 43 issues a command to the front passenger's seat airbag cutoff warning lamp driver 45 to light the front passenger's seat airbag cutoff warning lamp 9, thereby giving a notification that operation of the front passenger's seat airbag has been cut off (disabled).

The deployment/timing selector 43 checks for the proper condition of the airbag operating system whenever power is switched or continuously and, if a problem is detected in any function thereof, writes into a failure storage area of the non-volatile memory 44, and also lights the airbag warning lamp 10 to warn the occupant.

Additionally, it will be understood that while in the foregoing embodiment the description was for the case in which the airbag deployment mode of both the driver and the front passenger's seats are controlled by the distance to the driver as determined by the driver's seat position detection system 1, the present invention is not restricted to this arrangement. Alternately, as shown in FIG. 1, it is possible when the front passenger's seat weight detection system 3 detects an occupant in the front passenger's seat to cause the front passenger's seat position detection system 2 to operate, and to additionally input the distance measurement result from the front passenger's seat position detection system 2 to the airbag control unit 4, so as to independently control the deployment mode of the driver's seat airbag and the front passenger's seat airbag in accordance with the respective distances measured at the driver's seat the front passenger's seat.

Figure 6:
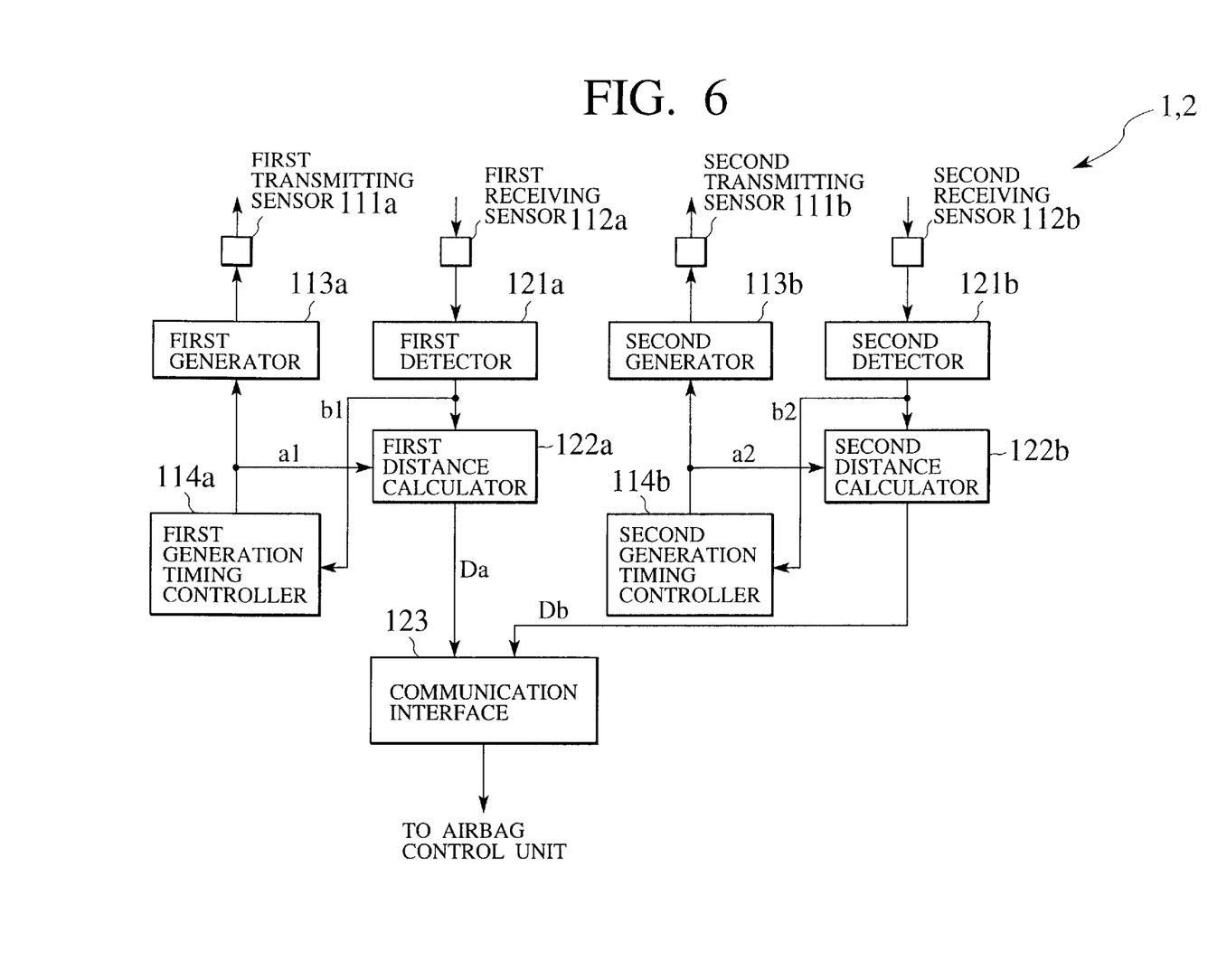
FIG. 6 is a block diagram showing the detailed internal configuration of the driver's seat position detection system and front passenger seat position detection system in a second embodiment of the present invention.

Additionally, as shown in FIG. 6, it is possible to provide dual configurations for each of the driver's seat position detection system 1 and the front passenger's seat position detection system 2 shown in FIG. 1, thereby enabling measurement of the distance D from an airbag deployment port to an occupant with an even shorter period. That is, two signals of the same or different frequencies and of the same type (for example, ultrasonic or infrared) are used as range-finding signals generated by the dual position detection systems for alternate measurement of distance with a slight time skew between the signals. Alternately, it is possible to use two signals of different types (for example one ultrasonic signal and one infrared signal) as range-finding signals that alternately measure the distance, with a slight time skew between the signals. The detected distances D from each of these dual systems are alternately output to the airbag control unit 4 via the communication interface 123.

In the above-noted configuration, the first signal processing system of the ultrasonic or infrared sensors 11 and 21 is formed by a first transmitting sensor 111a for generating a first ultrasonic or infrared range-finding signal, a first receiving sensor 112a for receiving a reflected first range-finding signal returning from the direction of the occupant, a first generator 113a which causes the first transmitting sensor 111a to output a first range-finding signal, and a first generation timing controller 114a for receiving a reflected signal receiving timing signal b1 with respect to the first range-finding signal and outputting a first range-finding signal generation command to the first generator 113a. The first signal processing system of the position detection units 12 and 22 is formed by a first detector 121a for detecting a reflected signal of the first range-finding signal from a signal received by the first receiving sensor 112a, a first distance calculator 122a for receiving a timing signal a1 indicting the timing of generation of the first range-finding signal and a timing signal b1 indicating the timing of reception of the returning signal by the first detector 121a, and calculating the distance Da to the occupant from the spatial propagation distance of the first range-finding signal, based on the time difference therebetween, and a communication interface 123 for outputting the detected distance Da to the airbag control unit 4.

Similarly, the second signal processing system of the ultrasonic or infrared sensors 11 and 21 is formed by a second transmitting sensor 111b for generating a second ultrasonic or infrared range-finding signal, a second receiving sensor 112b for receiving a reflected second range-finding signal returning from the direction of the occupant, a second generator 113b which causes the second transmitting sensor 111b to output a second range-finding signal, and a second generation timing controller 114b for receiving a reflected signal receiving timing signal b2 with respect to the second range-finding signal and outputting a second range-finding signal generation command to the second generator 113b. The second signal processing system of the position detection units 12 and 22 is formed by a second detector 121b for detecting a reflected signal of the second range-finding signal from a signal received by the second receiving sensor 112b, a second distance calculator 122b for receiving a timing signal a2 indicting the timing of generation of the second range-finding signal and a timing signal b2 indicating the timing of reception of the returning signal by the second detector 121b, and calculating the distance Db to the occupant from the spatial propagation distance of the second range-finding signal, based on the time difference therebetween, and a communication interface 123 for outputting the detected distance Db to the airbag control unit 4.

By using a duplicated transmitting/receiving system with respect to range-finding signals, by skewing the timing of alternated generation of range-finding signals by a time that is shorter than the time required for measurement of the distance of an occupant to the airbag deployment port in the worst case, in which the occupant is in close proximity thereto, it is possible to accurately detect the position of the occupant immediately before the start of airbag deployment, thereby enabling proper selection of the airbag deployment mode.

In the foregoing embodiment it may be preferable to use an ultrasonic signal or an infrared signal as the range-finding signal.

The airbag deployment mode selection system of the present invention may preferably use a duplicated system of distance sensors and signal generation timing controllers to alternately measure the distance, thereby enabling measurement of the distance from a distance sensor to an occupant with a further reduced period, and providing further accuracy in measuring the distance of an occupant to the airbag deployment port immediately before the start of operation of the airbag so as to more properly select the appropriate airbag deployment mode.

The contents of Japanese Patent Application No. 11-13446 are incorporated herein by reference.

While preferred embodiments of the present invention have been described, such description is for illustrative purposes, and it is to be understood that changes and variations may be made without departing from the spirit or scope of the following claims.

What is claimed is:

1. An airbag deployment mode selection system comprising:

a distance sensor comprising a range-finding signal generator which generates a range-finding signal directed at a seated occupant and a signal receiver which receives a reflected signal returning from the occupant, by which a distance from an airbag deployment port to the occupant is calculated based on a difference between timing of the generation and the reception;

a signal generation timing controller which causes the range-finding signal generator to generate a new range-finding signal immediately after the reflected signal from a previously generated range-finding signal is received by the signal receiver of the distance sensor; and an airbag deployment mode selector which specifies a full deployment mode when the distance of the occupant to the airbag deployment port is greater than a prescribed value and specifies a tailored deployment mode when the distance of the occupant to the airbag deployment port is less than the prescribed value.

2. An airbag deployment mode selection system according to claim 1, wherein the range-finding signal is either an ultrasonic signal or an infrared signal.

3. An airbag deployment mode selection system according to claim 1, comprising two systems of distance sensors and signal generation timing controllers, by which the distance is alternately measured.

4. An airbag deployment mode selection system comprising:

distance sensing means comprising a range-finding signal generator for generating a range-finding signal directed at a seated occupant and a signal receiver for receiving a reflected signal returning from the occupant, by which a distance from an airbag deployment port to the occupant is calculated based on a difference between timing of the generation and the reception;

signal generation timing controlling means for causing the range-finding signal generator to generate a new range-finding signal immediately after the reflected signal from a previously generated range-finding signal is received by the signal receiver of the distance sensing means; and airbag deployment mode selecting means for specifying a full deployment mode when the distance of the occupant to the airbag deployment port is greater than a prescribed value and specifying a tailored deployment mode when the distance of the occupant to the airbag deployment port is less than the prescribed value.

* * * * *